Dec. 28, 1926.                                                    1,612,410
C. BELLVIS ET AL
BEVERAGE POT
Filed June 23, 1926

Inventors
Camilo Bellvis
and José Montesano
by
Their attorney

Patented Dec. 28, 1926.

1,612,410

UNITED STATES PATENT OFFICE.

CAMILO BELLVIS AND JOSÉ MONTESANO, OF ZARAGOZA, SPAIN.

BEVERAGE POT.

Application filed June 23, 1926. Serial No. 117,920.

This invention relates to a novel portable coffee-pot for family use, and is different from the other utensils of this description at present in use in that it unites in a single apparatus several advantages, since it serves for the preparation of the infusion of coffee, tea, or other similar hot drinks, with the special characteristic that it retains the aroma during the boiling of the water, which is an important detail and is due to the absolutely hermetical closing of the apparatus. Besides this, it is portable and may be used to pour the liquid directly into the cup without employing any other receptacle, as is usually done in serving such hot drinks at table.

Besides the convenient handling of this apparatus for family use, it offers the advantages of rapidity and security, and is also economical in fuel, for the water boils in very few minutes, and the pot can then be taken off the fire to serve the drink at table.

The invention consists in a novel coffee pot for preparing infusions of coffee, tea and other hot drinks characterized by two metal receptacles, an inner and an outer one, the former having a hemispherical lid with a central orifice, to permit the introduction of a threaded support which is hollow and whose upper end terminates in a perforated thread, and its lower end in a horizontal bridge, resting on two studs arranged laterally in the said inner receptacle; a spring safety whistle, graduable, mounted on the extremity of the above mentioned nut; a fusible safety escapement placed in the lid in the form of a screw and filled with a mixture of lead, so as to resist a pressure of five atmospheres; an egress tube for the liquid fixed on the bottom of the inner receptacle and passing through the wall of it so as to communicate with the outer receptacle, its shutter being a spindle with a conical point which rests on a threaded support soldered above the spindle and to the outer wall of the inner receptacle; and a cover to surround the upper part of the outer receptacle so as to avoid the egress of the steam when the spindle is opened.

The apparatus is shown in the attached drawing, in which—

Figure 1:
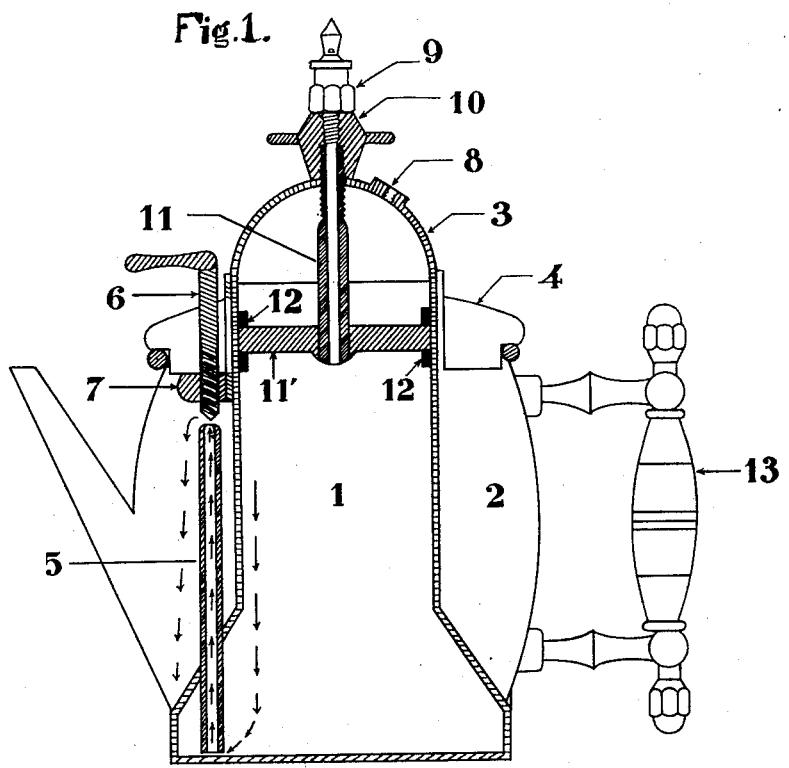

Fig. 1. is a vertical section, and in which—

1. is the inner body of the coffee-pot.
2. is the outer body of the same.
3. shows the cover of the hemispherical part of the inner body.
4. is the cover of the outer body.
5. shows the tube for the egress of the liquid and of the steam.
6. is the closing spindle of the egress tube.
7. shows the support of the closing spindle of said tube.
8. shows the arrangement of the fusible safety escapement.
9. is a spring safety whistle, graduable and screwed in the upper part of the coffee-pot.
10. represents the nut of the hemispherical covering.
11. shows the support, and 11' the bridge of the hermetic closing.
12. are two studs, the side of each of which is united to the inner body of the coffee-pot.
13. is the handle of the coffee-pot.

Figure 2:
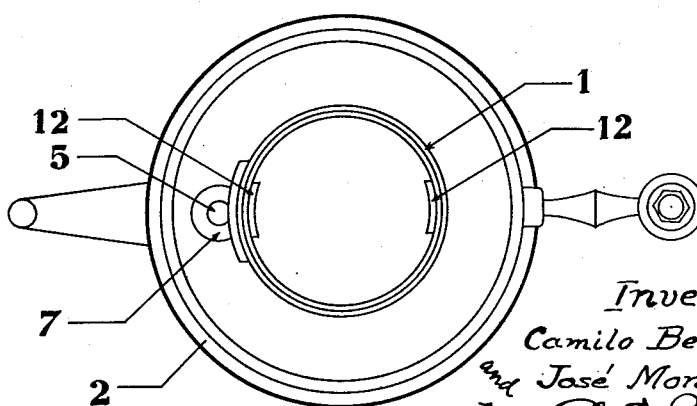

Fig. 2 represents the apparatus seen from above, and the same numbers indicate the above mentioned parts.

The coffee-pot is constructed of a sheet of soft iron, (and may be of any capacity and of any variety in its exterior form, so as to produce the most elegant effect), of alpaca and of nickeled metals, and consists of two receptacles, the inner one 1 and the exterior one 2. The receptacle 1 has a hemispherical lid 3, which forms a hermetic closing. The centre of the lid is perforated and allows the passage of a support 11, on whose upper part is screwed the nut 10. This support is hollow and has at its lower end a horizontal bridge 11', which is supported between two studs 12, which are respectively placed on both sides and in the upper part, very near the mouth of the receptacle 1. The nut 10, which is also hollow, is provided in its upper part with a spring safety whistle, graduable, to give notice when the water boils.

Besides this safety-valve, which prevents an explosion of the coffee-pot when it has not been taken off the fire in time, there is on the hemispherical covering 3 a fusible safety escapement 8 which is adjusted on the lid in the form of a screw, its interior being filled with a metal alloy (a mixture of lead) so as to resist a steam pressure of five atmospheres, and to melt automatically when this point has been exceeded. The receptacle 1 has in its front part an egress tube 5 for the liquid, which tube passes along the wall of the said receptacle and its upper part enters the receptacle 2. The closing of this tube 5 in its upper part is effected by means of a spindle 6 with a conical point, which hermetically closes the tube, the said spindle being sustained by a threaded support 7, suitably soldered above the tube 5. The two receptacles inner and outer, of the coffee-pot, 1 and 2 respectively, are surrounded in their upper part by a cover 4, the object of which is to close the coffee-pot so as to avoid the constant egress of the steam when the spindle-closing is opened, and of course the said cover 4 is not a hermetical closing.

The coffee-pot is used as follows:—The receptacle 1 is filled with water, leaving a suitable space for the formation of steam and adding to the water the necessary quantity of ground coffee, tea or other substances, from which it is desired to extract a beverage; the coffee-pot is then placed on the fire until the rising of the temperature of the liquid produces a pressure of two and a half atmospheres. The whistle which resists exactly this pressure, commences to announce the boiling of the liquid, and at this moment the pot may be taken off the fire, as the infusion is complete. When this has been done, the spindle of the egress tube is opened, and the pressure of the steam forces the liquid from the inner to the exterior receptacle. As soon as the coffee is in the exterior receptacle it is ready to be poured into the cups, and there remains no liquid in the inner receptacle, but only the residue of the ground coffee, tea, or other aromatic herbs which have been added to the water to form an infusion. In order to keep this residue at the bottom of the receptacle 1, it may be previously placed in a small receiver, suitably perforated, so that the liquid may not become turbid by the transfusion.

By this novel process for preparing the infusion of coffee, tea and other hot drinks, the complete extraction of the substances is obtained, as the hermetic closing of the pot prevents the aroma from escaping, so that the beverages thus prepared retain their full flavour. Another advantage is that this coffee-pot does not require a spirit-lamp, as any kind of fuel may be employed to boil the water.

Having now described our invention, what we claim is:

1. Novel coffee-pot for preparing infusions of coffee, tea and other hot drinks, characterized by two metal receptacles, an inner and an outer one, the former having a hemispherical lid with a central orifice, to permit the introduction of a threaded support, which is hollow and whose upper end terminates in a perforated thread, and its lower end in a horizontal bridge, resting on two studs arranged laterally in the said inner receptacle; an adjustable spring safety whistle, mounted on the extremity of the above mentioned nut; a fusible safety escapement placed in the lid in the form of a screw and filled with a mixture of lead, so as to resist a pressure of five atmospheres; an egress tube for the liquid, fixed on the bottom of the inner receptacle and passing through the wall of it, so as to communicate with the outer receptacle, its shutter being a spindle with a conical point, which rests on a threaded support soldered above the spindle and on the outer wall of the inner receptacle; and a cover to surround the upper part of the outer receptacle, so as to avoid the egress of the steam when the spindle is opened.

2. In a pot of the character set forth, for making decoctions of coffee, tea and other hot drinks under pressure, an inner receptacle and an outer receptacle arranged in spacedly nested relation, a dome-shaped lid for the inner receptacle presenting a central perforation, a tubular stem extending through this perforation and its upper portion being externally threaded, a clamping nut on the outer end of said tubular stem, an adjustable pressure operated signalling device on said stem above said nut, said stem, said nut, and said signalling device, and the interior of said inner receptacle all in open communication, a stationary bridge member extending across the said inner receptacle and the inner end of said tubular stem being anchored in this bridge member against upward displacement under the pull of said clamping nut, a pressure fuse disposed in said dome, a tube hermetically ascending through the dividing wall of said two receptacles from close to the bottom of the inner receptacle into the upper portion of the outer receptacle, means for controlling the issue of prepared liquid from said ascending tube, comprising a bracket member extending from the outer receptacle, and a handled spindle, presenting a cone-shaped lower extremity, threading within said bracket in axial alinement with said ascending tube for coaction with the mouth of said ascending tube, and a cover for said outer receptacle.

In testimony whereof we affix our signatures.

CAMILO BELLVIS.
JOSÉ MONTESANO.